United States Patent
Matsushita et al.

(10) Patent No.: US 10,222,491 B2
(45) Date of Patent: Mar. 5, 2019

(54) X-RAY DATA PROCESSING APPARATUS AND METHOD AND PROGRAM FOR THE SAME

(71) Applicant: Rigaku Corporation, Akishima-shi, Tokyo (JP)

(72) Inventors: Kazuyuki Matsushita, Ome (JP); Takuto Sakumura, Hachiouji (JP); Yasukazu Nakaye, Ome (JP)

(73) Assignee: RIGAKU CORPORATION, Tokyo (JP)

( * ) Notice: Subject to any disclaimer, the term of this patent is extended or adjusted under 35 U.S.C. 154(b) by 434 days.

(21) Appl. No.: 15/177,611

(22) Filed: Jun. 9, 2016

(65) Prior Publication Data

US 2016/0377749 A1    Dec. 29, 2016

(30) Foreign Application Priority Data

Jun. 24, 2015 (JP) .................................. 2015-127043

(51) Int. Cl.
  *G01T 1/24* (2006.01)
  *G01T 7/00* (2006.01)
  *G01T 1/17* (2006.01)

(52) U.S. Cl.
  CPC ................ *G01T 7/005* (2013.01); *G01T 1/17* (2013.01)

(58) Field of Classification Search
  CPC ........... G01T 7/005; G01T 1/243; G01T 1/17; H04N 5/32
  See application file for complete search history.

(56) References Cited

U.S. PATENT DOCUMENTS

2014/0236523 A1    8/2014    Matsushita et al.
2015/0139390 A1*   5/2015    Bellazzini ............... G01T 1/247
                                                         378/62

FOREIGN PATENT DOCUMENTS

JP    2012-242111 A    12/2012
JP    2014-159973 A    9/2014

OTHER PUBLICATIONS

Kraft, P. et al. "Performance of single-photon-counting PILATUS detector modules", Journal of Synchrotron Radiation, Wiley-Blackwell Munksgaard, DK, vol. 16, No. 3, May 1, 2009 (May 1, 2009), pp. 368-375, XP002632471.
Nilsson et al., "Charge sharing suppression using pixel-to-pixel communication in photon counting X-ray imaging systems", Nuclear Instruments and Methods in Physics Research, Section A, vol. 576, 2007, pp. 243-247.

* cited by examiner

*Primary Examiner* — Don Wong
(74) *Attorney, Agent, or Firm* — Birch, Stewart, Kolasch & Birch, LLP

(57) ABSTRACT

The X-ray data processing apparatus to estimate a true value from an X-ray count value detected by the pixel array X-ray detector of a photon counting system includes a management unit 210 to receive and manage a detection value for each detection part, an effective area ratio calculation unit 230 to calculate a ratio of a detection ability under the influence of the charge share to an original detection ability in the detection part as an effective area ratio of the detection part using data regarding the detection part and data regarding an X-ray source and a detection energy threshold value, and a correction unit 250 to correct the managed count value using the calculated effective area ratio to estimate a true value.

5 Claims, 13 Drawing Sheets

| Pixel size | Th = 6 keV | Th = 7 keV | diff/1 keV |
|:---:|:---:|:---:|:---:|
| 172 μm | ≈ 91 % | ≈ 87 % | ≈ 6 % |
| 100 μm | ≈ 85 % | ≈ 77 % | ≈ 8 % |
| 75 μm | ≈ 80 % | ≈ 71 % | ≈ 9 % |

FIG. 6

X-RAY DATA PROCESSING APPARATUS AND METHOD AND PROGRAM FOR THE SAME

BACKGROUND OF THE INVENTION

Field of the Invention

The present invention relates to an X-ray data processing apparatus for estimating a true value from a counted value for X-ray intensity of a specific X-ray source and to a method and program for the same.

Description of the Related Art

In a pixel array detector of a photon counting system, typically a monolithic sensor is used and therefore a definite boundary does not exist between pixels within the sensor. Typically only a read-out pad portion is formed in a pixel shape on the side connected to a read-out chip (refer to Patent Literature 1).

Therefore, when a carrier diffuses in a boundary part of neighboring pixels, there occurs a phenomenon called charge share in which a charge corresponding to one photon is shared between the pixels. Because of this charge share, even if the intensity of an incident X-ray is constant, there exists a case where the count becomes larger than an original count or a case where the count becomes smaller than the original count, depending on a threshold value set for each of the pixels.

While, conventionally, measurement has been performed neglecting the influence of the charge share, or the measurement has been performed minimizing the influence by setting an appropriate value to the threshold value, such a method cannot remove the effect of the charge share. On the other side, there has been performed a study of mounting a circuit for cancelling the influence itself of the charge share between pixels in the read-out chip (refer to Non-patent Literature 1).

PATENT LITERATURE

Patent Literature 1: Japanese Patent Laid-Open Publication No. 2012-242111
Patent Literature 2: Japanese Patent Laid-Open Publication No. 2014-159973

NON-PATENT LITERATURE

Non-patent Literature 1: H. E. Nilsson, B. Norlin, Frojdh, L. Tlustos, "Charge sharing suppression using pixel-to-pixel communication in photon counting X-ray imaging systems", Nuclear Instruments & Methods in Physics Research, Available online 6 February, A576, 2007, 243-247

However, the method of mounting the circuit for cancelling the influence of the charge share needs to compare signal wave heights between the pixels. Therefore, the mounting of the comparator occupies a considerable area and variation is caused in a threshold value for comparison between the comparators. Further, when the pixel size is small, it is difficult to handle the charge share across a plurality of pixels.

SUMMARY OF THE INVENTION

The present invention has been achieved in view of such a situation, and aims to provide an X-ray data processing apparatus capable of correcting an X-ray count value which is detected by a pixel array X-ray detector of a photon counting system under the influence of the charge share, without using a comparator or the like.

(1) For achieving the above purpose, an X-ray data processing apparatus of the present invention is an X-ray data processing apparatus that estimates a true value from an X-ray count value detected by a pixel array X-ray detector of a photon counting system, the apparatus including: a management unit to receive and manage a count value for each detection part; an effective area ratio calculation unit to calculate a ratio of a detection ability under influence of charge share to an original detection ability in the detection part as an effective area ratio of the detection part using data regarding the detection part and data regarding an X-ray source and a detection energy threshold value; and a correction unit to correct the managed count value using the calculated effective area ratio to estimate a true value. Thereby, it is possible to correct the X-ray count value which is detected by the pixel array X-ray detector of the photon counting system under the influence of the charge share without using a comparator or the like.

(2) Further, in the X-ray data processing apparatus of the present invention, the effective area ratio calculation unit calculates the effective area ratio for each X-ray source and each detection energy threshold value, and the correction unit expresses the calculated effective area ratio as a coefficient of simultaneous equations and performs linear transformation of a count value for each detection energy threshold value to a correction value for each X-ray source using the simultaneous equations. Thereby, it is possible to reduce the influence of the charge share having a wavelength dependence even when a multi-wavelength X-ray enters the detection part.

(3) Further, in the X-ray data processing apparatus of the present invention, the data regarding the detection part is data which is preliminarily stored in accordance with the detection part and expresses a size of the detection part and a distribution of charge spread within the detection part. Thereby, it is possible to estimate the influence of the charge share and calculate the effective area ratio depending on the characteristics and the shape of the detection part.

(4) Further, a method of the present invention is a method of X-ray data processing for estimating a true value from an X-ray count value detected by a pixel array X-ray detector of a photon counting system, the method comprising the steps of: receiving and managing a count value for each detection part; calculating a ratio of a detection ability under influence of charge share to an original detection ability in the detection part as an effective area ratio of the detection part using data regarding the detection part and data regarding an X-ray source and a detection energy threshold value; and correcting the managed count value using the calculated effective area ratio to estimate a true value. Thereby, it is possible to correct the influence of the charge share.

(5) Further, a program of the present invention is a program of X-ray data processing for estimating a true value from an X-ray count value detected by a pixel array X-ray detector of a photon counting system, the program causing a computer to execute a series of processing comprising the processes of: receiving and managing a count value for each detection part; calculating a ratio of a detection ability under influence of charge share to an original detection ability in the detection part as an effective area ratio of the detection part using data regarding the detection part and data regarding an X-ray source and a detection energy threshold value; and correcting the managed count value using the calculated effective area ratio to estimate a true value. Thereby, it is possible to correct the influence of the charge share.

According to the present invention, it is possible to correct the X-ray count value which is detected by the pixel array X-ray detector of the photon counting system under the influence of the charge share, without using a comparator or the like.

BRIEF DESCRIPTION OF THE DRAWINGS

FIG. 6 is a table showing an influence of the charge share in accordance with a pixel size and a threshold value.

DETAILED DESCRIPTION OF THE INVENTION

Next, embodiments of the present invention will be explained with reference to the drawings. For easy understanding of the explanation, the same reference number is attached to the same constituent in each of the drawings and duplicated explanation will be omitted.

(Entire Configuration)

Figure 1:
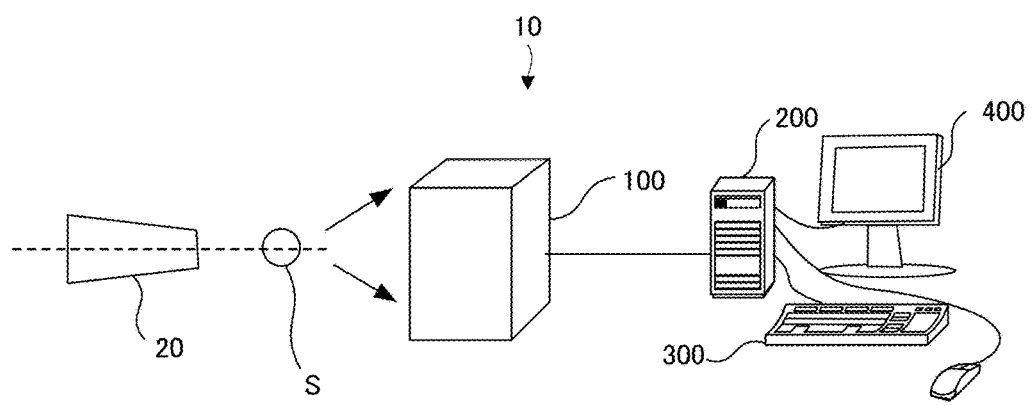
FIG. 1 is a schematic illustration showing a configuration of an X-ray diffraction system of the present invention.

FIG. 1 is a schematic illustration showing a configuration example of an X-ray measurement system 10. As shown in FIG. 1, the X-ray measurement system 10 is configured with an X-ray source 20, a sample S, an X-ray detector 100, and an X-ray data processing apparatus 200.

The X-ray source 20 generates an X-ray by causing an electron flux radiated from a filament as a cathode, for example, to collide with a rotor target as an anti-cathode. The X-ray radiated from the X-ray source 20 is a so-called point-focused X-ray beam having a circular or rectangular dot-like cross-sectional shape.

It is possible to convert the X-ray source 20 into an X-ray source having multi wavelengths by providing a plurality of kinds of metals having atomic numbers different from each other (e.g., Mo and Cu) on the outer peripheral surface of the rotor target. When an electron collides with the Cu target, an X-ray is radiated including the CuK$\alpha$-ray (wavelength: 1.542 Å) of a characteristic ray, and, when an electron collides with the Mo target, an X-ray is radiated including the MoK$\alpha$-ray (wavelength: 0.711 Å) of a characteristic ray. The CuK$\alpha$-ray and the MoK$\alpha$-ray which are characteristic X-rays of target materials different from each other are mixed in the X-ray emitted from the rotor target.

The sample S is supported by a sample support device. The sample support device is determined depending on the characteristics of the sample S and the kind of measurement. The X-ray detector 100 detects a diffraction X-ray diffracted by the sample S and a fluorescent X-ray. The X-ray data processing apparatus 200 processes measured X-ray data of the diffraction X-ray and the fluorescent X-ray and displays the measurement result. The X-ray detector 100 and the X-ray data processing apparatus 200 will be described below in detail.

(Configuration of the X-Ray Detector and the X-Ray Data Processing Apparatus)

Figure 2:
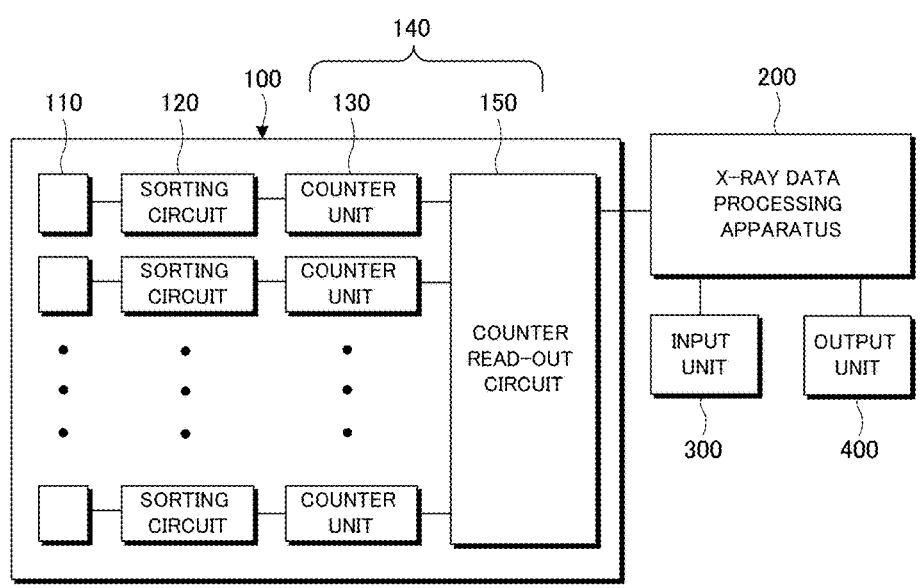
FIG. 2 is a block diagram mainly showing configurations of an X-ray detector and an X-ray data processing apparatus.

FIG. 2 is a block diagram mainly showing configurations of the X-ray detector 100 and the X-ray data processing apparatus 200. The X-ray detector 100 includes a plurality of pixels 110 for X-ray reception (detection parts) and is a two-dimensional semiconductor detector, for example. The plurality of pixels 110 is arrayed two-dimensionally and arranged regularly. Here, the detector is not limited to the two-dimensional semiconductor detector and may be a one-dimensional semiconductor detector.

A sorting circuit 120 is connected to each of the plurality of pixels 110, and further a counter unit 130 is connected to each of the sorting circuits 120. A counter read-out circuit 150 is connected to each of the counter units 130.

The sorting circuit 120 sorts pulse signals from the pixel 110 for each X-ray wavelength and outputs the result. The counter unit 130 counts the number of signals sorted for each wavelength by the sorting unit 120. The counter unit 130 includes the same number of counter circuits as the number of sorts so as to cause the number of pulse signals sorted by the sorting circuit 120 to be counted for each of the sorts, for example. The output signal of the counter read-out circuit 150 is transmitted to the X-ray data processing apparatus 200 via a communication line as X-ray data separated by an energy threshold value.

The X-ray data processing apparatus 200 is a personal computer, for example. The personal computer is configured with a CPU for operational control, a memory for data storage, system software stored in a predetermined region within the memory, application program software stored in another predetermined region within the memory, and the like, for example.

The X-ray data processing apparatus 200 is connected with a keyboard or the like as an input unit 300 to receive a user input. A user can perform the display of the measurement result, the instruction of the correction, and the like via the input unit 300. Further, the input unit 300 receives the input of data regarding the X-ray source and the detection energy threshold value. Here, the X-ray source includes not only the X-ray source for sample irradiation but also a fluorescent X-ray source. Further, the X-ray data processing apparatus 200 is connected with an output unit 400 such as a display or a printer. The output unit 400 outputs the measurement result in response to an instruction from the X-ray data processing apparatus 200.

Figure 3A:
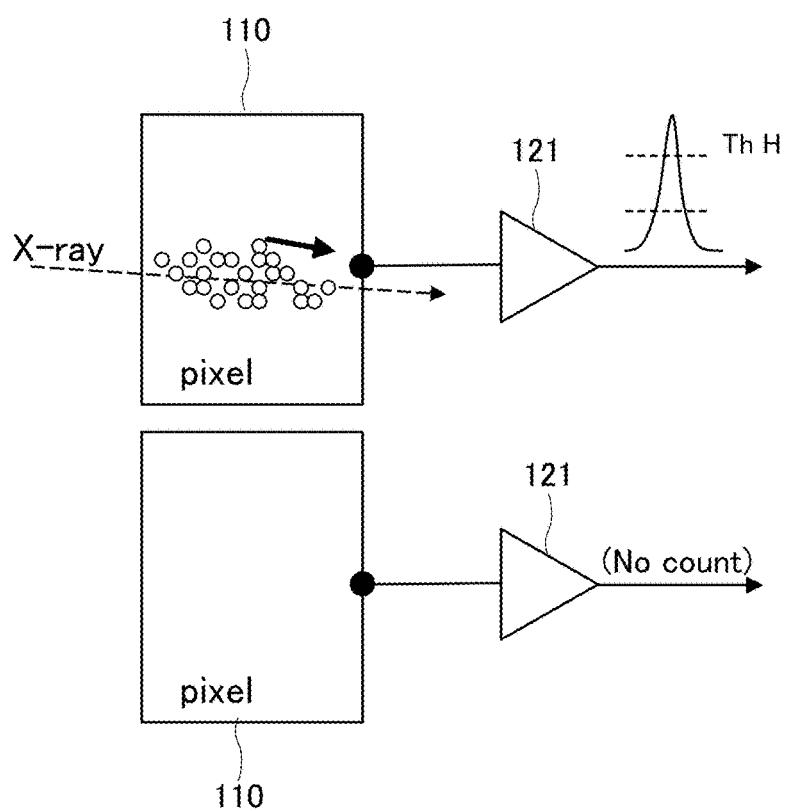
FIG. 3A and FIG. 3B are schematic illustrations showing X-ray detection in a case where the charge share is not caused and a case where the charge share is caused, respectively.
Figure 3B:
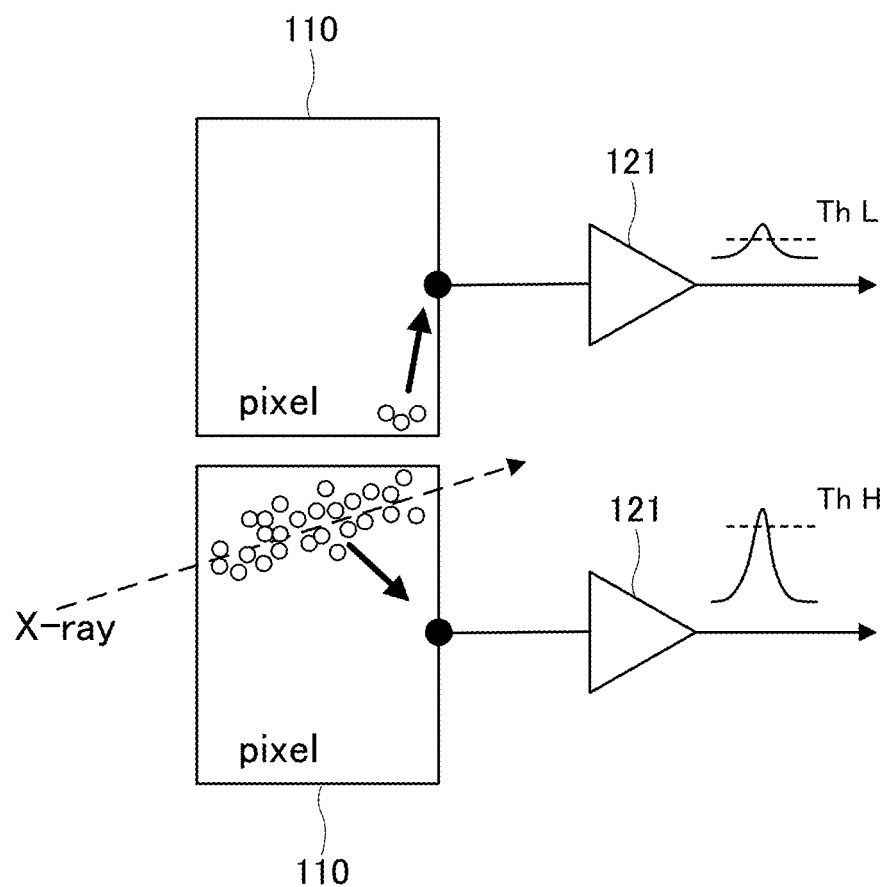

FIG. 3A and FIG. 3B are schematic illustrations showing X-ray detection in a case where the charge share is caused and a case where the charge share is not caused, respectively. As shown in FIG. 3A, when the X-ray enters only a single pixel 110, the charge share is not caused and accurate measurement is possible. However, as shown in FIG. 3B, a charge cloud generated near the surface of the X-ray detector 100 spreads until reaching an electrode to cause the charge share. Due to the charge share caused across the two pixels 110, the peak detected in one pixel 110 becomes low and a low peak is also detected in the other pixel 110.

(Configuration of the X-Ray Data Processing Apparatus)

Figure 4:
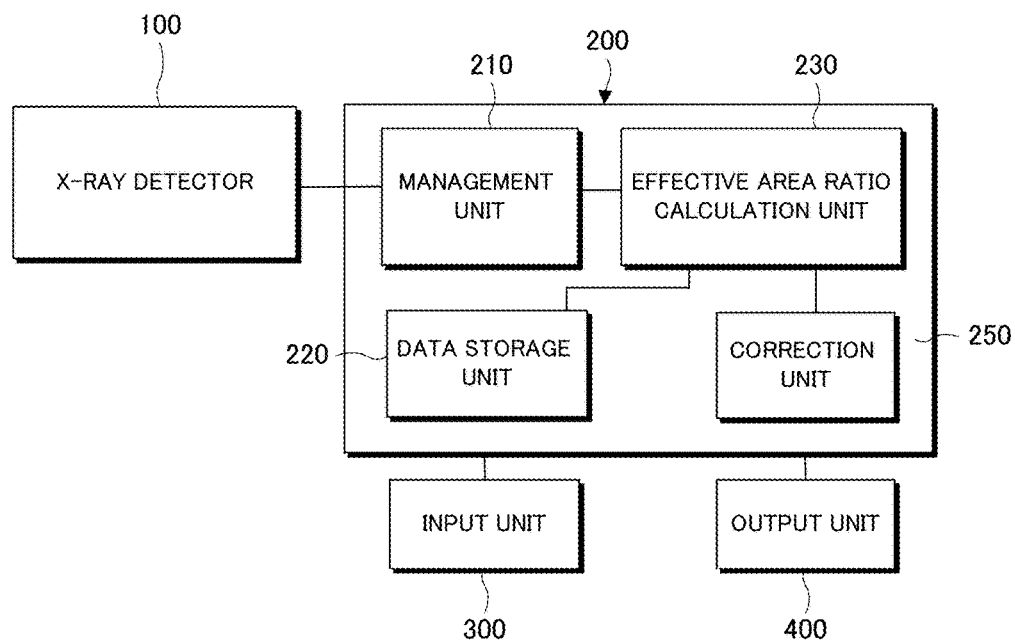
FIG. 4 is a block diagram mainly showing a configuration of the X-ray data processing apparatus.

FIG. 4 is a block diagram mainly showing a configuration of the X-ray data processing apparatus 200. The X-ray data processing apparatus 200 includes a management unit 210, a data storage unit 220, an effective area ratio calculation unit 230 and a correction unit 250, and estimates a true value from the X-ray count value. Here, the X-ray data processing apparatus 200 may be used for separating diffraction X-ray data sets of a plurality of kinds of radiation sources, and may be used for separating the fluorescent X-ray from the diffraction X-ray data.

The management unit 210 receives and manages the count value detected by the X-ray detector 100 for each pixel. For example, the management unit 210 determines the diffraction X-ray intensity for each wavelength and stores the resultant data in association with the address (i, j) of the pixel 110. The management unit 210 can display both diffraction image data sets of a stored diffraction X-ray image of the Cu X-ray source and a stored diffraction X-ray image of the Mo X-ray source, for example, on the output unit 400 in response to a user instruction. It is possible to display either one of the diffraction images, and also it is possible to display both of the images at the same time.

The data storage unit 220 stores the data regarding the sensor material, structure, and pixel of the X-ray detector 100, and the data regarding the X-ray source 20 and the detection energy threshold value. The data regarding the pixel is data to express the pixel size and shape and the distribution of the charge spread within the sensor which are preliminarily stored in accordance with the pixel. Further, the data regarding the X-ray source 20 and the detection energy threshold value is data to express a condition when the X-ray measurement system 10 is used and input by the user. Thereby, it is possible to estimate the influence of the charge share and calculate the effective area ratio depending on the pixel characteristics and shape.

The effective area ratio calculation unit 230 calculates a ratio of a detection ability under the influence of the charge share to an original detection ability in a pixel as an effective area ratio of the pixel using the data regarding the pixel and the input data. In particular, for a plurality of X-ray sources and a plurality of threshold values, the effective area ratio calculation unit 230 calculates an effective area ratio for each of the X-ray sources and each of the detection energy threshold values.

The correction unit 250 corrects the managed count value using the calculated effective area ratio to estimate a true value. In this manner, it is possible to correct the X-ray count value which is detected by the pixel array X-ray detector of the photon counting system under the influence of the charge share. Specifically, for the plurality of X-ray sources and the plurality of threshold values, the correction unit 250 expresses the calculated effective area ratio as a coefficient of simultaneous equations and, using the simultaneous equations, performs linear transformation of the count value for each of the detection energy threshold values to a correction value for each of the X-ray sources. Thereby, it is possible to reduce the influence of the charge share having a wavelength dependence even when a multi-wavelength X-ray enters the pixel.

(Correction and Calculation of the Effective Area Ratio Used in the Correction)

The effective area ratio of the charge share has a dependence on a threshold wavelength and the wavelength of an incident X-ray. The count value of the X-ray having reached the pixel is estimated for each wavelength by the use of this wavelength dependence and a count value measured by the plurality of threshold values.

Different two wavelengths are denoted by A and B, and different two appropriate threshold values are denoted by L and H. Further, the true numbers of photons in the X-rays which reach each pixel from radiation sources having the wavelengths A and B are denoted by $I_A$ and $I_B$, respectively, and count values observed by the threshold values L and H are denoted by $I_L$ and $I_H$, respectively. When the pixel effective area ratio is expressed as $p_{LA}$ for the case determined by the threshold value L and the wavelength A, the relationship between the observed count value and the true number of photons is obtained as in the following formula (1).

$$P \begin{pmatrix} I_A \\ I_B \end{pmatrix} = \begin{pmatrix} I_L \\ I_H \end{pmatrix} \quad (1)$$

$$\therefore P = \begin{pmatrix} p_{L_A} & p_{L_B} \\ p_{H_A} & p_{H_B} \end{pmatrix}$$

When a matrix formed by the effective area ratios is denoted by P, the inverse matrix is obtained as in the following formula (2), and thereby it becomes possible to obtain the count values by the X-ray sources A and B independently from the count values observed without discriminating signals of the wavelengths A and B.

$$\begin{pmatrix} I_A \\ I_B \end{pmatrix} = P^{-1} \begin{pmatrix} I_L \\ I_H \end{pmatrix} \quad (2)$$

When charge spread within the semiconductor sensor is assumed to follow a normal distribution and the standard deviation thereof is assumed to be $\sigma$, and one-side length of the pixel is denoted by d, the effective area ratio p can be approximated as in the following formula (3) (if $d \gg \sigma$).

$$p = \left(1 - 2 \times \sqrt{2\left(\frac{\sigma}{d}\right)^2} \times erfc^{-1}\left(\frac{\lambda_{Th}}{\lambda} \times 2\right)\right)^2 \quad (3)$$

Here, $\lambda$ is the wavelength of a target X-ray, and $\lambda_{TH}$ is a threshold wavelength of the detection circuit. When $d \gg \sigma$ does not hold, it is necessary to consider the effect of the four corners of the pixel.

The above X-ray measurement system 10 can be used for separating a polychromatic radiation source. For example, diffraction X-ray intensities of the Cu radiation source and the Mo radiation source $I_{Cu}$ and $I_{Mo}$ can be obtained by the following formula (4) by the use of the X-ray count values $I_H$ and $I_L$ which are separated by a high energy side threshold value and a low energy side threshold value, respectively.

$$P \begin{pmatrix} I_{Cu} \\ I_{Mo} \end{pmatrix} = \begin{pmatrix} I_L \\ I_H \end{pmatrix} \quad (4)$$

-continued $$\begin{pmatrix} I_{Cu} \\ I_{Mo} \end{pmatrix} = P^{-1} \begin{pmatrix} I_L \\ I_H \end{pmatrix}$$

$$\therefore P = \begin{pmatrix} p_{LCu} & p_{LMo} \\ p_{HCu} & p_{HMo} \end{pmatrix}$$

Further, the above X-ray measurement system 10 can be applied to the regeneration of a uniformity correction table after temperature correction without hypothetical uniform irradiation.

Example 1

Figure 5:
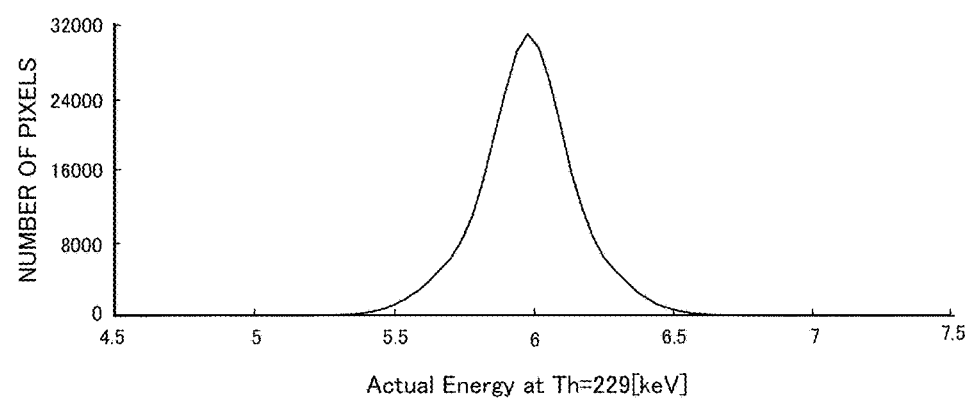
FIG. 5 is a graph showing gain variation of an ROIC.

Measurement was performed using the above X-ray measurement system 10. A standard read-out integrated circuit (ROIC) used in the X-ray detector 100 has a gain variation. For example, even when the threshold value is set to 6 keV, the actually detected energy is varied for each pixel. FIG. 5 is a graph showing the gain variation of the ROIC. In the example shown in FIG. 5, the gain has a distribution of an average value μ=6.0 keV and a standard deviation σ=0.2 keV.

The detection of an X-ray was performed using an X-ray detector including, on the surface, a rectangular pixel having a one-side length of 100 μm, a sensor thickness of 320 μm, and a carrier spread of a Gaussian distribution σ=5.0 μm. The influence of the charge share is different in magnitude depending on the size of a pixel, and the effective area ratio is also different. FIG. 6 is a table showing the influence of the charge share depending on the pixel size and the threshold value. When a variation of approximately 1 keV is caused with respect to a set value because of the variation in the performance of the ROIC, the count value of the X-ray varies in approximately 8%.

Figure 7:
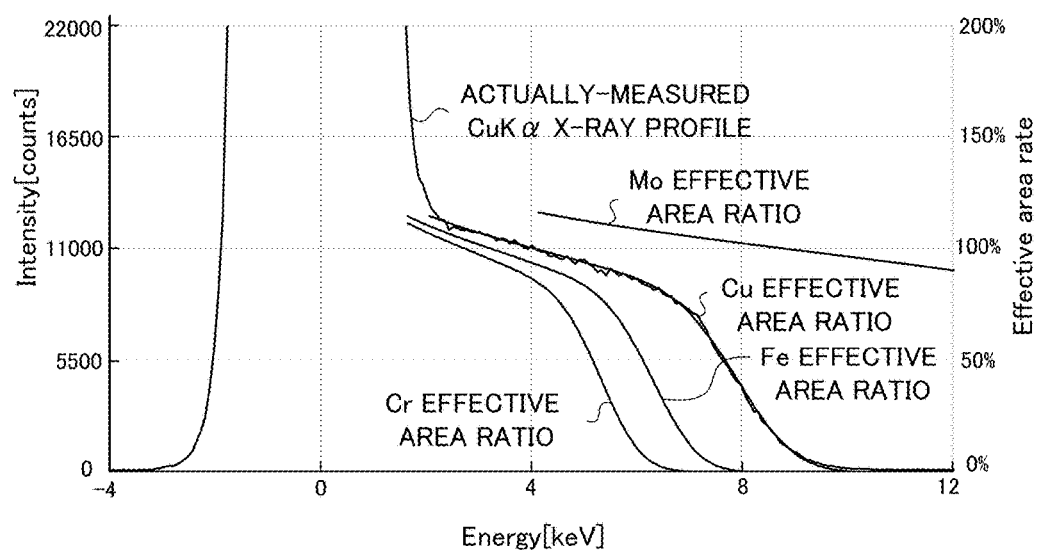
FIG. 7 is a graph showing an actually measured X-ray profile and an effective area ratio curve for each X-ray source.

The X-ray intensity of the CuK ray was measured with respect to a threshold value by the use of an X-ray detector as above, and also the effective area ratio of the X-ray detection was calculated with respect to the threshold value for each of Mo, Cu, Fe, and Cr radiation sources. FIG. 7 is a graph showing an actually measured X-ray profile and an effective area ratio curve for each of the X-ray sources. In the calculation, the effective area ratio curve was assumed to have the center of a noise peak at 0 keV and the threshold value was calculated. Further, a Gaussian distribution of FWHM 24% (e.g., σ=830 eV at 8.04 keV) was convoluted to an effective area-threshold value curve which was calculated for a monochromatic X-ray of 8.04 keV. As a result, the actually measured profile of CuK X-ray and the effective area ratio curve in the X-ray detection of the Cu radiation source coincided with each other approximately.

Example 2

There will be explained an example of correcting the experimental data obtained by the use of the above X-ray measurement system, using the effective area ratio. An experimental result as in the following formula (5) is assumed to have been obtained by the use of the Cu radiation source.

$$Th_L = 4.5 \text{ keV}, Th_H = 6.5 \text{ keV } I_L = 10559, I_H = 8795 \quad (5)$$

When simple correction is performed for the experimental result like this using the effective area ratio, the X-ray count value is corrected as in the following formula (6).

$$p_{LCu} = 0.968 \quad (6)$$

$$p_{HCu} = 0.802$$

$$I_{Cu} = \frac{I_L}{0.968} = 10908.06$$

$$I_{Cu} = \frac{I_H}{0.802} = 10966.33$$

When the above experimental result is obtained by the X-ray irradiation of the Cu radiation source onto a sample made of iron, reflecting a reduction amount by the fluorescent X-ray, it is possible to calculate the X-ray intensity $I_{Cu}$ formed by the Cu radiation source and the X-ray intensity $I_{Fe}$ of the fluorescent X-ray as in the following formula (7).

$$p_{LFe} = 0.889 \quad (7)$$

$$p_{HFe} = 0.300$$

$$\begin{pmatrix} 0.889 & 0.968 \\ 0.300 & 0.802 \end{pmatrix} \begin{pmatrix} I_{Fe} \\ I_{Cu} \end{pmatrix} = \begin{pmatrix} I_L \\ I_H \end{pmatrix}$$

$$\begin{pmatrix} I_{Fe} \\ I_{Cu} \end{pmatrix} = \begin{pmatrix} 1.898 & -2.291 \\ -0.710 & 2.104 \end{pmatrix} \begin{pmatrix} I_L \\ I_H \end{pmatrix}$$

$$= \begin{pmatrix} -108.36 \\ 11007.79 \end{pmatrix}$$

Further, when it is clear that the incident X-ray is monochrome, a background and an intensity at an effective area ratio of 100% are obtained.

$$\begin{pmatrix} 0.889 & 0.968 \\ 0.300 & 0.862 \end{pmatrix} \begin{pmatrix} I_{Fe} \\ I_{Cu} \end{pmatrix} = \begin{pmatrix} I_L - I_{BG} \\ I_H - I_{BG} \end{pmatrix} \quad (8)$$

$$\begin{pmatrix} I_{Fe} \\ I_{Cu} \end{pmatrix} = \begin{pmatrix} 0.00 \\ 10623.42 \end{pmatrix} (\because I_{Fe} = 0)$$

$$I_{BG} = 275.73$$

Example 3

Figure 8A:
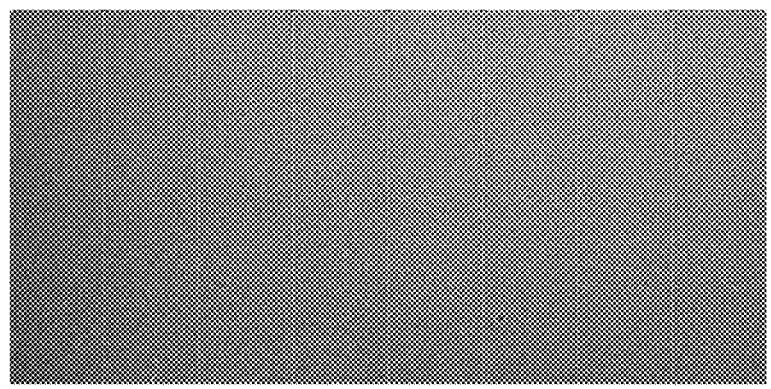
FIG. 8A and FIG. 8B are illustrations showing respective images in a case without correction and in a case with correction using an effective area ratio.
Figure 8B:
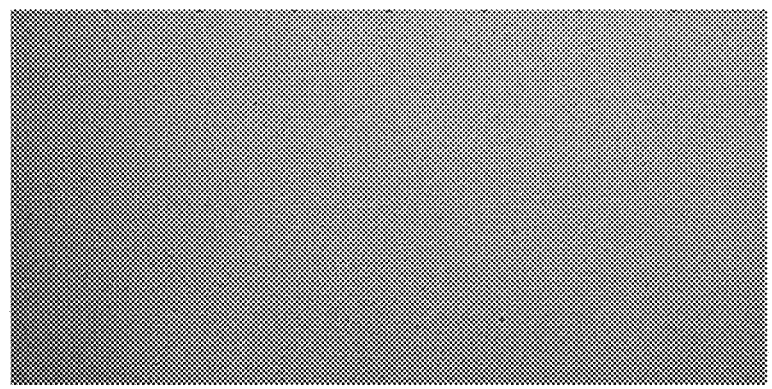

An actually detected X-ray intensity was corrected by the use of the effective area ratio in an X-ray measurement system provided with an X-ray detector including a rectangular pixel having a one-side length of 100 μm. The count value correction among the ROICs connected to the sensor in parallel was performed by employing a simply averaged value. FIG. 8A is an illustration showing an image in a case without the correction and FIG. 8B is an illustration showing an image with the correction using the effective area ratio. In the case without the correction, the overall count value is small, and, on the other side, in the case with the correction, the overall count value becomes large.

Figure 9:
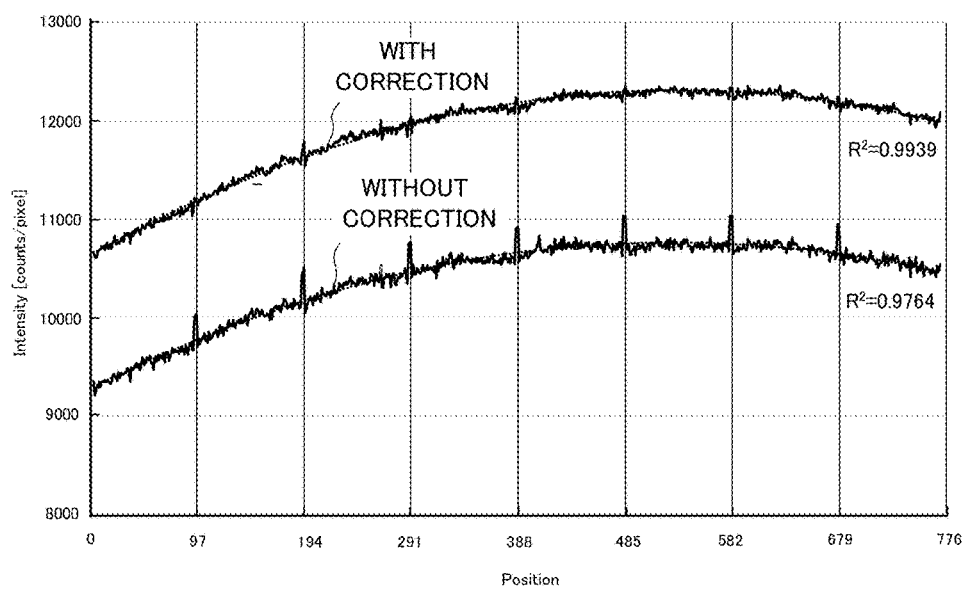
FIG. 9 is a graph showing intensity distributions in cases with and without correction using an effective area ratio.

FIG. 9 is a graph showing intensity distributions in cases with and without the correction using the effective area ratio. For the curve in the case without the correction, the overall count value is small, and the count value variation among the pixels becomes large. On the other side, for the curve in the case with the correction, the overall count value is large and the count value variation among the pixels becomes small.

Example 4

A diffraction pattern was photographed when a powder sample made of iron was irradiated with an X-ray by the use of the Cu radiation source under the same condition as in above Examples. In this case, first, the photographing was performed with a threshold value set to 7 keV for reducing the fluorescent X-ray of Fe (fluorescent reduction mode). Next, X-ray images were photographed at threshold values of 5 keV and 7 keV, respectively. Then, for the photographed image, the simultaneous equations were solved by the use of the respective threshold values and the effective area ratios determined for each of the Cu radiation-source (8.04 keV) and the Fe radiation-source (6.4 keV) as the coefficient, and thereby the image was corrected and separated into images formed by the respective radiation sources (fluorescent separation mode).

Figure 10:
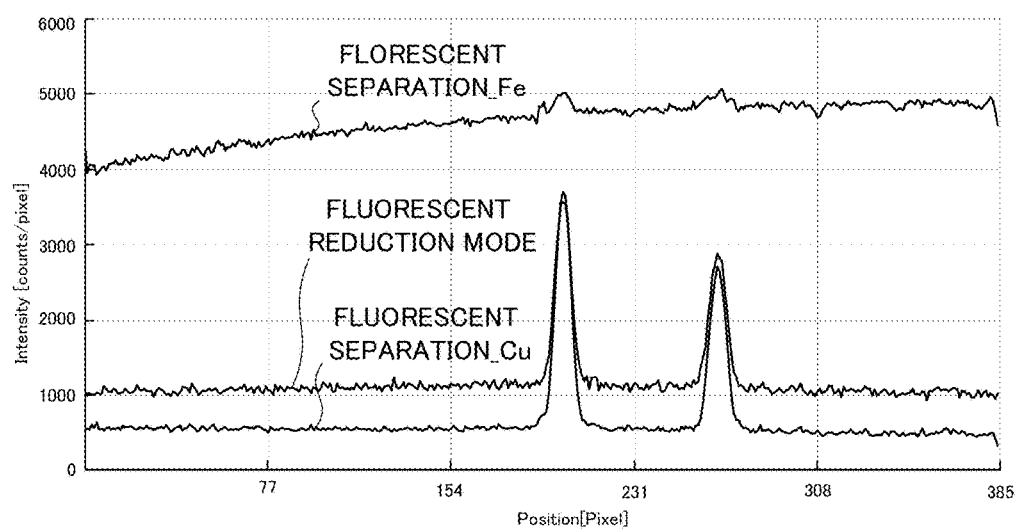
FIG. 10 is a graph showing an X-ray intensity measured in the fluorescent X-ray reduction mode and an X-ray intensity in which the fluorescent X-ray is removed by the correction using the effective area ratio.

FIG. 10 is a graph showing an X-ray intensity measured in the fluorescent X-ray reduction mode and an X-ray intensity in which the fluorescent X-ray is separated by the correction using the effective area ratio. FIG. 10 shows a measured data image of the fluorescent reduction mode and a fluorescent removal image which are plotted as average count profiles in a range of x=360 to 411. It was found that the graph of the fluorescent separation mode had an improvement of approximately three times in the SBR (Signal to Background Ratio) with respect to the graph of the fluorescent reduction mode.

In this manner, the separated image formed by the Cu radiation source (8.04 keV) was obtained as an image corresponding to an image formed by a Cu radiation source and obtained when photographed at a threshold value of 4.1 keV. Further, the image formed by Fe radiation source (6.4 keV) was obtained as an image corresponding to an image formed by the Fe radiation source when photographed at a threshold value of 3.3 keV.

Figure 11:
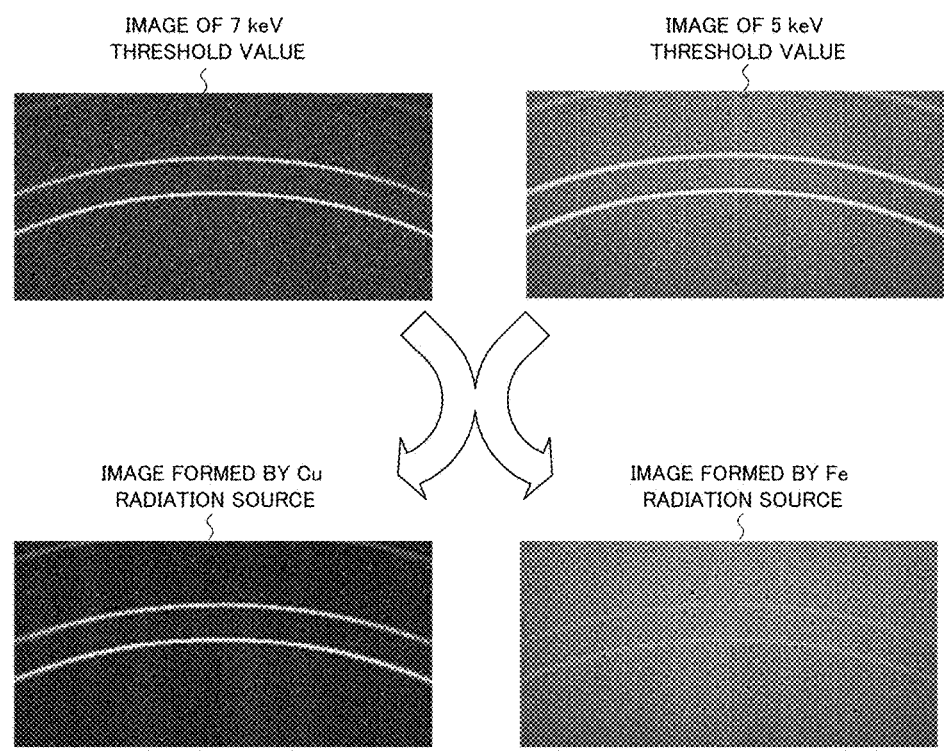
FIG. 11 is an illustration showing an image measured at each of threshold values of 5 keV and 7 keV (upper part), and a Cu radiation source image and an Fe radiation source image corrected by the use of effective area ratios (lower part).

FIG. 11 is an illustration showing images measured at threshold values of 5 keV and 7 keV, respectively, (upper part) and a Cu radiation source image and an Fe radiation source image corrected by the use of the effective area ratio (lower part). Compared with the image of the threshold value of 7 keV (upper left part), in the Cu radiation source image corrected by the use of the effective area ratio (lower left part), the diffraction line becomes clear and it is found that the fluorescent X-ray can be separated and removed as a background.

10 X-ray measurement system
20 X-ray source
100 X-ray detector
110 pixel (detection part)
120 sorting circuit
130 counter unit
150 counter read-out circuit
200 X-ray data processing apparatus
210 management unit
220 data storage unit
230 effective area ratio calculation unit
250 correction unit
300 input unit
400 output unit
S sample

What is claimed is:

1. An X-ray data processing apparatus that estimates a true value from an X-ray count value detected by a pixel array X-ray detector of a photon counting system, the apparatus comprising:
    a management unit to receive and manage a count value for each detection part;
    an effective area ratio calculation unit to calculate a ratio of a detection ability under influence of charge share to an original detection ability in the detection part as an effective area ratio of the detection part using data regarding the detection part and data regarding an X-ray source and a detection energy threshold value; and
    a correction unit to correct the managed count value using the calculated effective area ratio to estimate a true value.

2. The X-ray data processing apparatus according to claim 1, wherein
    the effective area ratio calculation unit calculates the effective area ratio for each X-ray source and each detection energy threshold value, and
    the correction unit expresses the calculated effective area ratio as a coefficient of simultaneous equations and performs linear transformation of a count value for each detection energy threshold value to a correction value for each X-ray source using the simultaneous equations.

3. The X-ray data processing apparatus according to claim 1, wherein
    the data regarding the detection part is data which is preliminarily stored in accordance with the detection part and expresses a size of the detection part and a distribution of charge spread within the detection part.

4. A method of X-ray data processing for estimating a true value from an X-ray count value detected by a pixel array X-ray detector of a photon counting system, the method comprising the steps of:
    receiving and managing a count value for each detection part;
    calculating a ratio of a detection ability under influence of charge share to an original detection ability in the detection part as an effective area ratio of the detection part using data regarding the detection part and data regarding an X-ray source and a detection energy threshold value; and
    correcting the managed count value using the calculated effective area ratio to estimate a true value.

5. A computer readable non-transitory storage medium to store a program of X-ray data processing for estimating a true value from an X-ray count value detected by a pixel array X-ray detector of a photon counting system, the program causing a computer to execute a series of processing comprising the processes of:
    receiving and managing a count value for each detection part;
    calculating a ratio of a detection ability under influence of charge share to an original detection ability in the detection part as an effective area ratio of the detection part using data regarding the detection part and data regarding an X-ray source and a detection energy threshold value; and
    correcting the managed count value using the calculated effective area ratio to estimate a true value.

* * * * *